(12) United States Patent
McCuskey

(10) Patent No.: US 6,709,191 B1
(45) Date of Patent: Mar. 23, 2004

(54) TACTILE INDICATORS FOR THE VISUALLY IMPAIRED AND METHOD OF INSTALLATION THEREOF

(76) Inventor: Celestine Patrick McCuskey, 5 Mariner Road, Illawong, New South Wales (AU), 2226

( * ) Notice: Subject to any disclaimer, the term of this patent is extended or adjusted under 35 U.S.C. 154(b) by 0 days.

(21) Appl. No.: 10/049,723
(22) PCT Filed: Aug. 21, 2000
(86) PCT No.: PCT/AU99/01143
§ 371 (c)(1),
(2), (4) Date: May 20, 2002
(87) PCT Pub. No.: WO00/39403
PCT Pub. Date: Jul. 6, 2000

(30) Foreign Application Priority Data

Dec. 23, 1998 (AU) .............................. PP 7909

(51) Int. Cl.[7] .............................. E01C 11/24
(52) U.S. Cl. .............................. 404/19
(58) Field of Search .............................. 404/19, 32, 42, 404/18, 35

(56) References Cited

U.S. PATENT DOCUMENTS

| | | | | |
|---|---|---|---|---|
| 848,075 A | * | 3/1907 | Wainwright | 52/179 |
| 1,503,773 A | * | 8/1924 | Stanwood | 52/179 |
| 1,572,854 A | * | 2/1926 | Clark et al. | 404/19 |
| 1,997,216 A | * | 4/1935 | Heltzel | 404/74 |
| 3,213,584 A | * | 10/1965 | Bush | 277/649 |
| 3,760,544 A | * | 9/1973 | Hawes et al. | 52/468 |
| 4,715,743 A | * | 12/1987 | Schmanski | 404/9 |
| 5,328,293 A | * | 7/1994 | Keefe | 404/9 |
| 5,775,835 A | * | 7/1998 | Szekely | 404/34 |
| 6,450,728 B1 | * | 9/2002 | Grahmbeek et al. | 404/15 |

FOREIGN PATENT DOCUMENTS

| | | | |
|---|---|---|---|
| GB | 2 338 501 | * | 12/1999 |
| JP | 11-225868 | * | 8/1999 |
| JP | 2001-348824 | * | 12/2001 |

* cited by examiner

*Primary Examiner*—Gary S. Hartmann
(74) *Attorney, Agent, or Firm*—Jacobson & Johnson

(57) ABSTRACT

There is a tactile indicator for the visually impaired having at least one marker head (22) which in a position of use protrudes above a walkway surface. A flange (23) extends down from the underside of the marker head (22) and is adapted for a close tolerance sliding fit into a channel cut in said walkway surface. There are a plurality of upwardly inclined ribs (25) formed on the flange (23) so that the flange (23) once push fitted into the channel is secured in place without adhesive by outward pressure of the ribs (25) on the sides of the channel.

10 Claims, 9 Drawing Sheets

TACTILE INDICATORS FOR THE VISUALLY IMPAIRED AND METHOD OF INSTALLATION THEREOF

FIELD OF INVENTION

This invention relates to warning markers or indicating devices. More particularly although not exclusively it discloses an improved pathway marker or tactile indicator for the visually impaired.

BACKGROUND OF THE INVENTION

In order to warn the visually impaired of danger areas or to simply identify a particular route or direction it is known to fix raised markers along walkways. These are called tactile indicators. The shape and configuration of the markers are set by the Australian Standards 1428.4. One version is circular, approximately 35 mm in diameter and 5 mm in height with inclined or bevelled edges at about 45 degrees. Another version is of similar height but elongated with a width of about 35 mm. The markers are designed to a size and shape which is readily sensed by the visually impaired using the foot or a cane while at the sime time providing only a minimum interference or hindrance to other pedestrian traffic. Current methods of fitting such indicators comprise the installation of ceramic or rubber tiles where a plurality of such markers are moulded into the upper surface at the regulation centre to centre spacing of 50 mm. Other fixing methods for existing walkways include drilling a grid of holes and then individually fitting markers which are each formed with elongated pin(s) extending out from the underside. The pins fit within the holes and are further secured with adhesive. Such prior art techniques however have a number of disadvantages. With the tiles the existing walkway surface has to be cut or chiselled away before the new surface can be glued or cemented in place. While the drilling of holes and fitting of the markers individually avoids removal of the existing surface, the placement and drilling procedure is time consuming and laborious.

SUMMARY OF THE INVENTION

It is therefore an object of this invention to ameliorate the aforementioned disadvantages and accordingly a tactile indicator is disclosed for the visually impaired having a marker head portion which in a position of use protrudes above a walkway or pavement surface and a flange means extending down from the underside of said head portion, said flange means being adapted for a close tolerance fit into a channel cut in said walkway or pavement.

Preferably according to one embodiment of the invention the ends of the flange means protrude laterally out past the edges of said head portion whereby a plurality of indicators positioned along said channel with adjacent flange portions abutting end to end follow a predetermined spacing for said marker head portions.

It is also preferred that said flange means is positioned laterally across the underside of said marker.

It is still further preferred that the surface of the flange means be formed with downwardly extending spaced apart ribs.

In an alternative version of the invention it is preferred that the tactile indicator comprise a plurality of spaced apart marker heads connected by a common flange.

In another aspect this invention also discloses a method of fitting a tactile indicator onto an existing walkway surface, said method including the steps of:

cutting one or a plurality of spaced apart parallel channels in said surface, and arranging one or a plurality of said tactile indicators so that the flanges thereof seat within said one or more channels.

Preferably the flanges are adapted to provide a predetermined spacing between the marker heads.

BRIEF DESCRIPTION OF THE DRAWINGS

Two currently preferred embodiments of the invention will now be described with reference to the attached representations in which.

DETAILED DESCRIPTION OF THE PREFERRED EMBODIMENT

Figure 1:
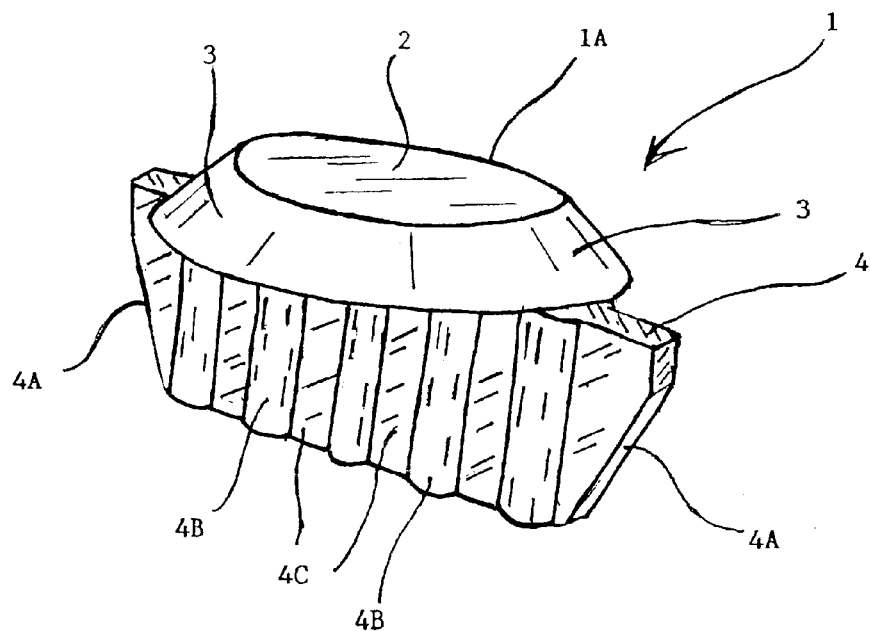
FIG. 1 is a perspective view from the top of a tactile hazard indicator according to a first embodiment of this invention.
Figure 2:
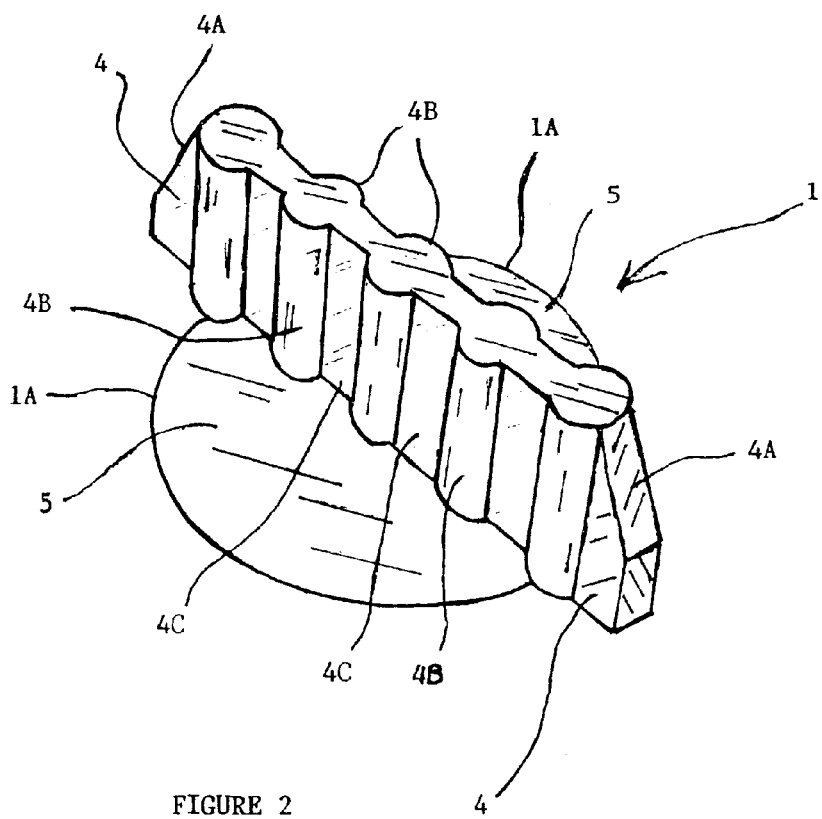
FIG. 2 is a perspective view of the indicator of FIG. 1 from the underside.

Referring first to FIGS. 1 and 2 the path finder indicator indicated generally as 1 may comprise a circular head portion 1A with a flat textured top 2 and bevelled sides 3. As mentioned earlier the shape configuration and size of the head portion 1A is set by Australian Standards. In accordance with this invention an elongated flange 4 extends out at right angles to a flat underside 5 of the head. This flange is preferably located diametrically across the underside and protrudes out past opposite sides of the head for spacing purposes as discussed later. The ends 4A may also be cut inwardly at an angle. Although the invention is not limited to any specific dimensions for the flange with the embodiment shown it is approximately 3 mm in width, 15 mm in height and 50 mm in length so as to extend out past the sides of the head about 7.5 mm.

Preferably the flange is also formed with spaced apart downwardly extending ribs 4B which bulge out about 1.5 mm from the sides of the flange and define recesses 4C therebetween.

Figure 3:
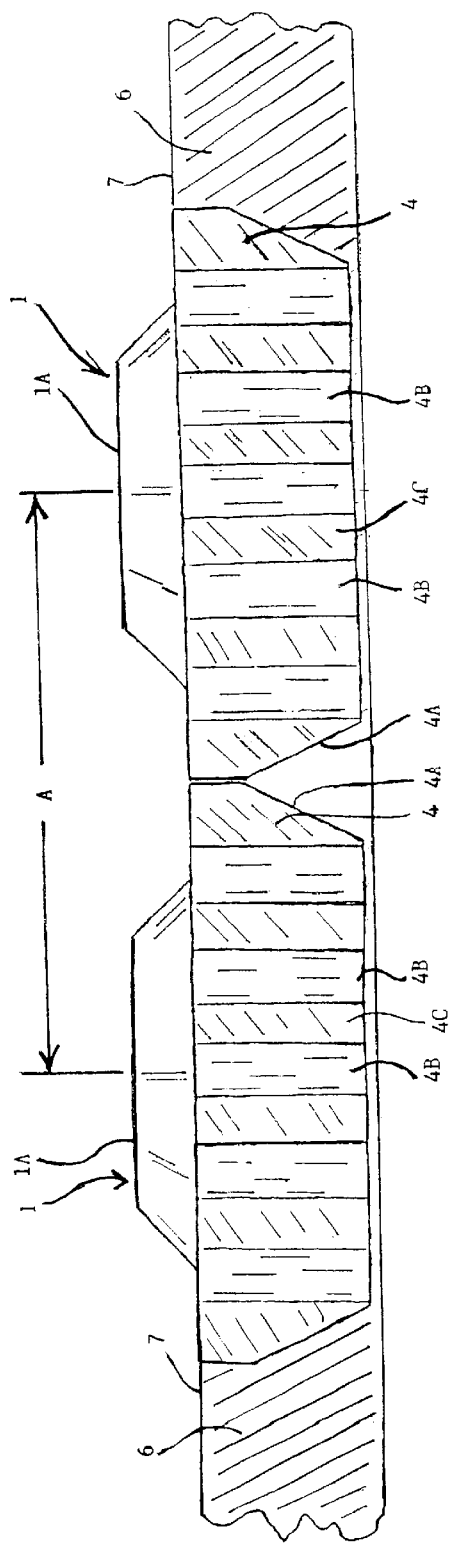
FIG. 3 is a cross-sectional view of a channel cut in a walkway showing the preferred method of installing such indicators.

The currently preferred method of installing these indicators according to this invention is by fitting them end to end along parallel channels previously cut into an existing walkway surface. The channels are preferably cut at 50 mm centres across the installation area. Each channel 6 as shown in cross-section by FIG. 3 is then fitted with indicators 1 by pushing the flanges 4 into them. Preferably the channels are cut about 6 mm wide and about 16 mm deep so that each indicator is a close tolerance fit and may be pushed down until the underside 5 of the head abuts the surface 7 of the walkway. It is also preferred that any suiitable type of adhesive be applied to the flange and/or channel before fitting to permanently secure the indicator in place. The spaces 4C defined between the ribs 4B provide recesses for the adhesive.

As will be appreciated by virtue of the length of the respective flanges which protrude out past the sides of the indicator heads 1A the required centre to centre spacing "A" of 50 mm, is automatically obtained when they are abutted end to end. The inwardly cut ends 4A mentioned earlier enable a close abutment of the markers to be maintained across irregularities and changes in the level of the walkway surface 7.

Figure 4:
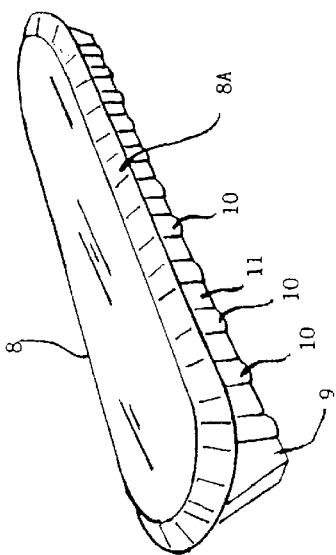
FIG. 4 shows a perspective view of a tactile directional indicator according to a second embodiment.

In accordance with a second form of the invention as shown in FIG. 4 the marker head 8 may be elongated so as to provide an indication of direction. In this case the shape and configuration is also set by the Australian Standards. It is of similar height to that of the first embodiment, has bevelled sides 8A and a width of 35 mm. Its length is preferably about 290 mm. Again in accordance with this invention a flange 9 extends out at right angles from the underside. In this case however it runs slightly less than the full length of the head. As these elongated indicators are normally set within separate individual channels rather than end to end as with the first embodiment the flange 9 preferably terminates inside the ends of the head. As with the first embodiment however the flange is preferably formed with spaced apart ribs 10 to provide recesses 11 for adhesive.

Figure 5:
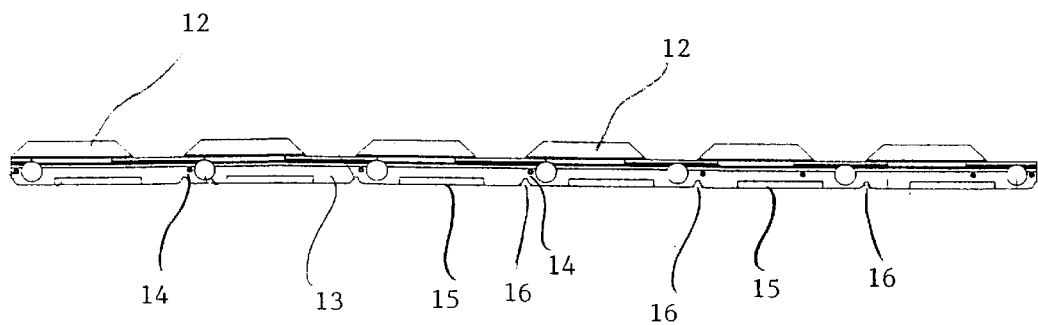
FIGS. 5 and 6 show side elevation and end views of a tactile hazard indicator according to a third embodiment.
Figure 6:
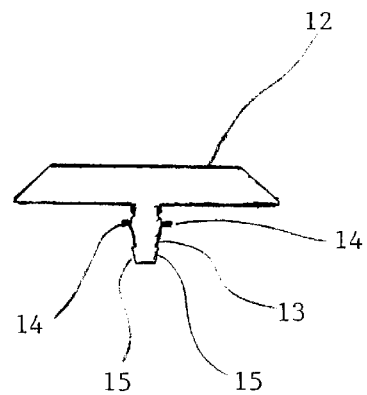

Referring now to FIGS. 5 and 6 there is shown a series of spaced apart circular hazard indicator heads 12 which are linked by a common flange 13. Although six heads having the same shape as those of FIG. 1 are shown in FIG. 5 the invention is not limited to this number. The flange is formed with pairs of outwardly protruding lugs 14 along its length. These lugs are adapted to press against the sides of the cut channels referred to earlier and hold the flange in place until the adhesive sets. Preferably there are also ledges 15 along the bottom of the flange to enable the adhesive when solidified to mechanically grip said flange. With the embodiment of FIGS. 5 and 6 the flange is relatively shallow so as to adapt the indicator for installation into hard surfaces such a concrete. With this embodiment notches 16 are formed at intervals of 50 mm along the length of the flange to provide flexibility over undulating substrate surfaces and also provide convenient cutting points.

Figure 7:
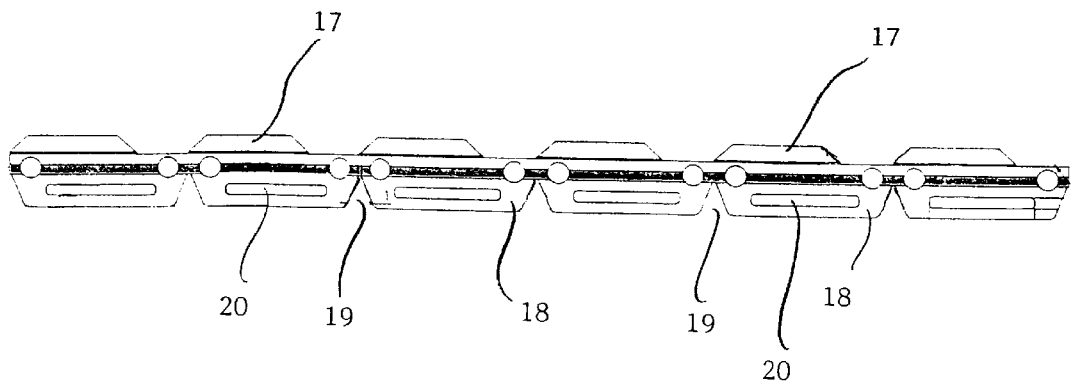
FIGS. 7 and 8 show side elevation and end views of a tactile hazard indicator according to a fourth embodiment.
Figure 8:
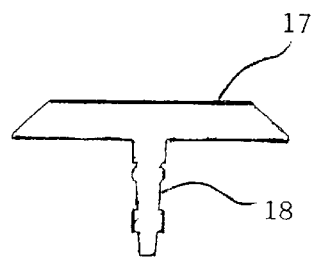

With the embodiment shown in FIGS. 7 and 8 the main components such as the indicator heads 17, flange 18 and notches 19 are of similar form. The depth of the flange however is greater for use in softer materials such as asphalt where a greater gripping area for the adhesive is required. There are also apertures 20 in the flange so that the adhesive can form a solid mechanical lock extending completely through said flange. Although not shown in the drawings lugs preferably protrude from each side of the flange as with the previous embodiment to hold the flange in place within the channel pending solidification of the adhesive.

Figure 9:
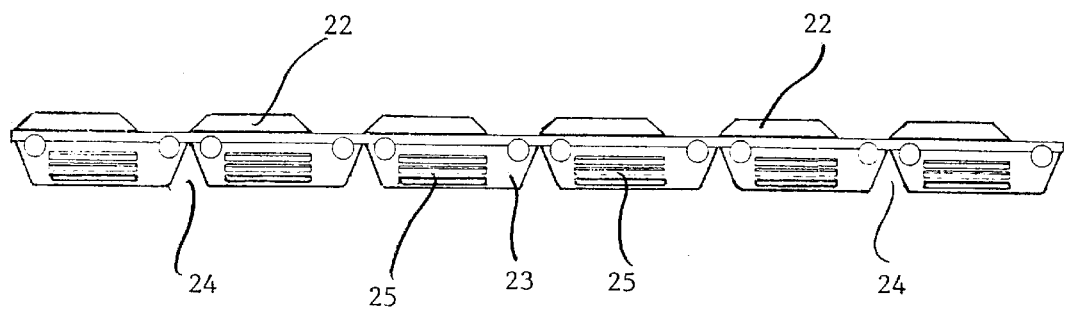
FIGS. 9 and 10 show side elevation and end views of a tactile hazard indicator according to a fifth embodiment.
Figure 10:
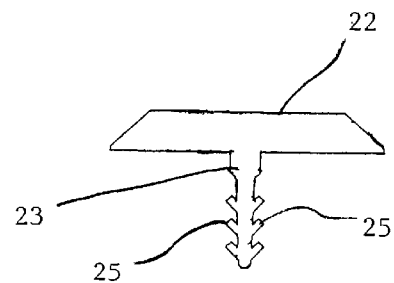

In FIGS. 9 and 10 the construction of the flange is similar to that of FIG. 7 with indicator heads 22, flange 23 and notches 24. The flange apertures however are deleted in favour of a series of upwardly incline ribs 25. These allow the flange to be push fitted into the channel by deflecting inwardly. Once the flange is in place however the outward pressure of the ribs on the sides of the channel operates to retain the flange in place without the use of adhesives. This enables a reduction is installation costs and also allows the indicators to be fitted in wet weather when the use of adhesives is not feasible. Although the invention is not restricted to any particular shape and configuration for the ribs they preferably incline upwards at about 45 degrees and have transverse dimensions sufficient to provide a secure grip on the sides of the chaneel into which the flange is pressed.

Figure 11:
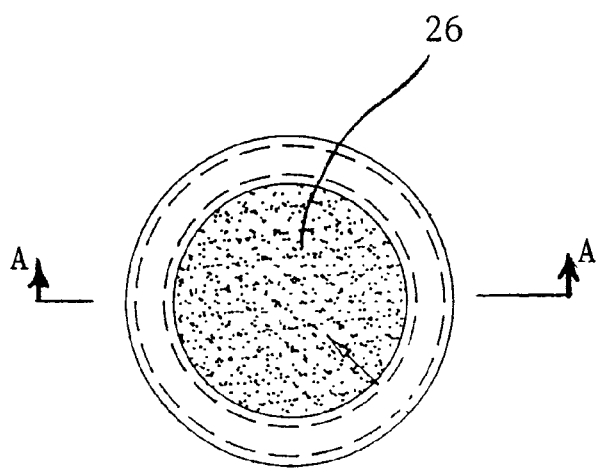
FIGS. 11 and 12 show plan and underside views of a tactile hazard indicator according to a sixth embodiment.
Figure 13:
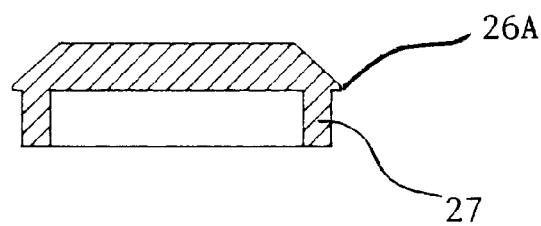
FIG. 13 shows a cross-sectional view along the lines A—A of FIG. 11.
Figure 12:
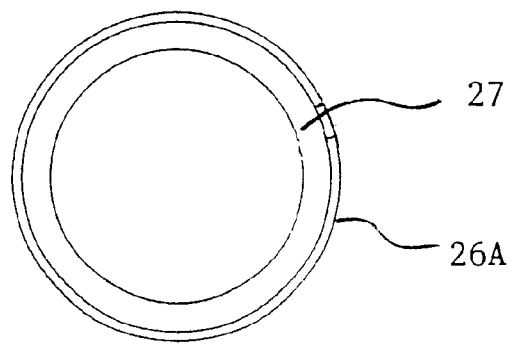

The hazard indicator of FIGS. 11 to 13 comprises an upper head portion 26 with a circular flange 27 around the underside. In use the flange is a close tolerance sliding fit into a circular aperture drilled into a walkway surface where the cutting of a channel is not feasible. Preferably the periphery 26A of the head portion protrudes out past the flange sufficiently to overlap the aperture and conceal any edge cracks or defects.

Figure 14:
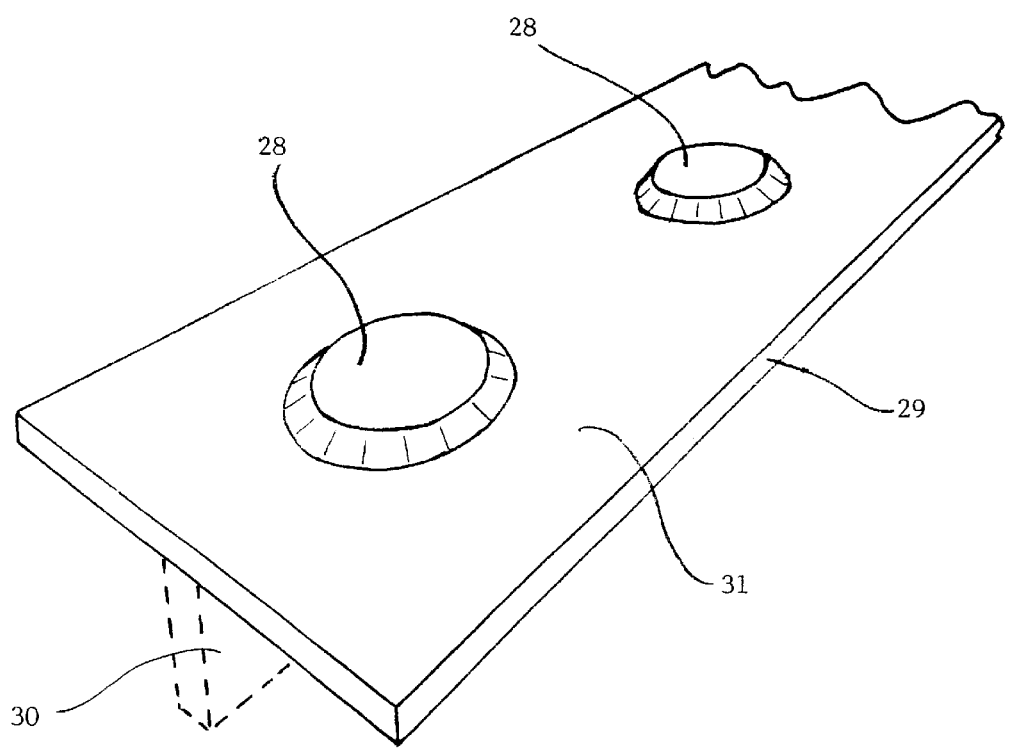
FIG. 14 shows a perspective view of an end portion of a tactile hazard indicator according to a seventh embodiment.
Figure 15:
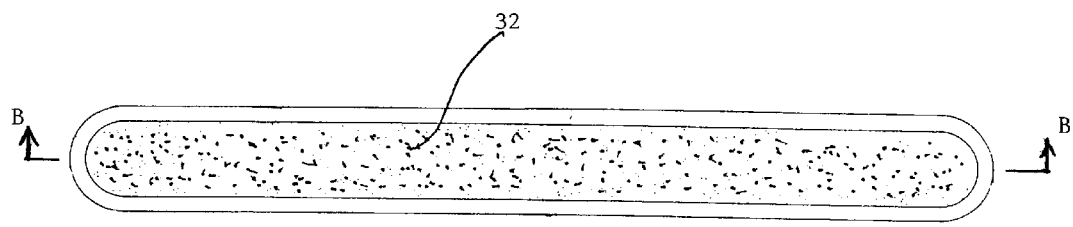
FIGS. 15 and 16 show plan and underside views of a tactile directional indicator according to an eighth embodiment.
Figure 16:
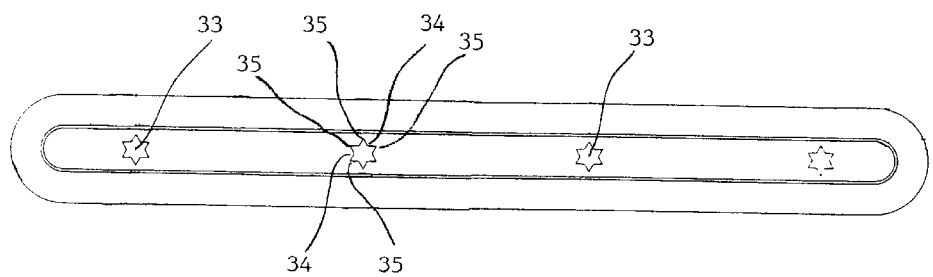
Figure 17:
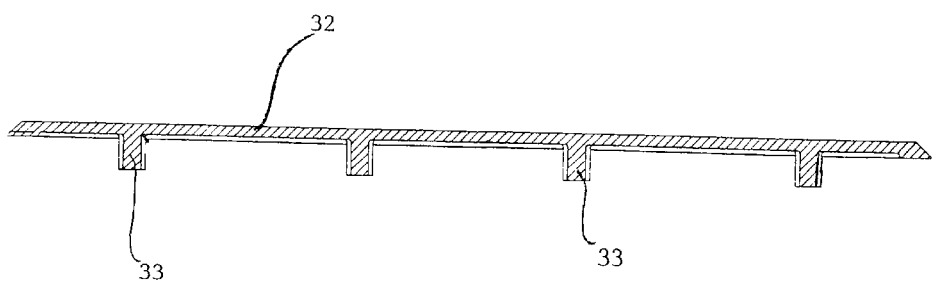
FIG. 17 shows a cross-sectional view along the lines B—B of FIG. 14, and FIGS. 18 and 19 show side, elevation and end views of a tactile directional indicator according to a ninth embodiment.

Turning now to FIG. 14 the hazard indicators 28 are incorporated here into a tile 29 with a flange 30 along the inderside. The flange is shown here in figurative form only at it may take various embodiments similar to that of the other described indicators. It is currently preferred however that it comprise the inclined ribs shown in FIGS. 9 and 10 so as to allow adhesive free fitting.

Figure 18:
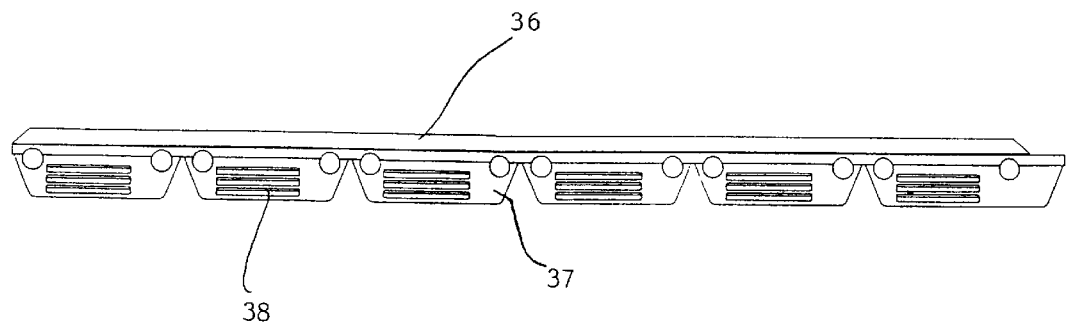
Figure 19:
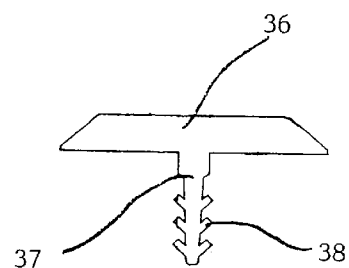

FIGS. 15 to 19 show further embodiments of the invention relating to tactile directional indicators having elongated heads 32. The fixing mechanism in FIGS. 16 and 17 comprises star shaped shafts 33 which are a press fit into holes drilled in a walkway surface where channels cannot be cut. The recesses 34 defined between the points 35 of the star shaped cross-sections provide passages through which the adhesive can flow as the shafts are pressed into said holes. As an alternative to these star shaped shafts FIGS. 18 and 19 show an elongated directional head 36 fitted with a flange 37 having inclined ribs 38 similar to those of FIGS. 9 and 10 so as to enable an adhesive free press fit into cut channels.

It will thus be appreciated that this invention at least in the form of the embodiments described provides novel and unique improvements to easy, quick and cost efficient methods of installation of tactile hazard and directional indicators for the visually impaired. Clearly however the examples disclosed are only the currently preferred forms of this invention and a wide variety of modifications may be made which would be apparent to a person skilled in the art. For example, the shape, configuration and size of the flanges may be varied according to installation requirements or design preference. Also, while the embodiments described are preferably injection moulded from polyurethane the invention extends to the use of any other suitable material and forming process.

The claims defining the invention are as follows:

1. A tactile indicator for the visually impaired, said indicator having two or more marker heads which in a position of use protrude above a walkway surface, said marker heads being mounted on a flange which extends down from and interconnects undersides of said marker heads, said flange being adapted for a close tolerance fit into a channel cut into said walkway surface, notches formed along a lower edge of the flange to provide flexibility over any undulations in said walkway surface and ends of said flange being angled inwardly toward said lower edge to enable close abutment with another said flange across any irregularities in said walkway surface.

2. The tactile indicator as claimed in claim 1 wherein said marker head is incorporated into the upper surface of a tile and said flange extends along the underside of said tile.

3. The tactile indicator as claimed in claim 2 wherein said marker head is circular.

4. The tactile indicator as claimed in claim 1 wherein outwardly projecting lugs are formed on said flange, said lugs being adapted to press against the sides of said channel to hold said flange in place pending setting of an adhesive in said channel.

5. The tactile indicator as claimed in claim 4 wherein there are ledges formed along the bottom of the flange to enable the adhesive to mechanically grip said flange.

6. The tactile indicator as claimed in claim 5 wherein apertures are formed in the flange so that the adhesive can form a solid mechanical lock extending through said flange.

7. The tactile indicator as claimed in claim 6 wherein a plurality of upwardly inclined ribs are formed on said flange whereby said flange, once push fitted into the channel, is secured in place without adhesive by outward pressure of the ribs on the sides of said channel.

8. The tactile indicator as claimed in claim 7 wherein said ribs are inclined upwardly at an angle of about 45 degrees.

9. The tactile indicator as claimed in claim 8 wherein the marker head is elongated.

10. A method of fitting a tactile indicator as claimed in claim 1 into said walkway surface, said method including the steps of:

cutting one or a plurality of spaced apart channels in said walkway surface, and placing one or more tactile indicators so that the flanges thereof seat within said one or more channels.

* * * * *